(12) United States Patent
Yoon et al.

(10) Patent No.: US 10,600,145 B2
(45) Date of Patent: Mar. 24, 2020

(54) IMAGE PROCESSOR, FOR SCALING IMAGE DATA IN TWO DIRECTIONS. COMPUTING SYSTEM COMPRISING SAME, AND RELATED METHOD OF OPERATION

(71) Applicant: SAMSUNG ELECTRONICS CO., LTD., Suwon-si, Gyeonggi-Do (KR)

(72) Inventors: Sung-Chul Yoon, Hwaseong-si (KR); Min-Soo Kim, Hwaseong-si (KR); Jae-Sop Kong, Gwacheon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 46 days.

(21) Appl. No.: 14/488,621

(22) Filed: Sep. 17, 2014

(65) Prior Publication Data
US 2015/0170330 A1 Jun. 18, 2015

(30) Foreign Application Priority Data
Dec. 13, 2013 (KR) .................. 10-2013-0155256

(51) Int. Cl.
*G09G 5/00* (2006.01)
*G06T 3/40* (2006.01)
*G06T 3/60* (2006.01)
*G06T 3/00* (2006.01)
*G06T 1/60* (2006.01)
(Continued)

(52) U.S. Cl.
CPC .................. *G06T 1/60* (2013.01); *G06T 1/20* (2013.01); *G06T 3/0006* (2013.01); *G06T 3/606* (2013.01); *H04N 5/2628* (2013.01); *G09G 2340/0407* (2013.01)

(58) Field of Classification Search
CPC .......... G06T 3/0006; G09G 2340/0407; G09G 2340/0428; G09G 5/373; G09G 5/391; H04N 5/2628
USPC ......................................... 345/619, 648, 660
See application file for complete search history.

(56) References Cited

U.S. PATENT DOCUMENTS

| 5,020,115 A | 5/1991 | Black |
| 5,854,641 A * | 12/1998 | Howard .................. G06T 3/606 345/545 |
| 5,867,608 A | 2/1999 | Rice |

(Continued)

FOREIGN PATENT DOCUMENTS

| JP | 2007-67917 | 3/2007 |
| JP | 2009198639 | 8/2009 |

(Continued)

OTHER PUBLICATIONS

Korean Office Action dated Nov. 14, 2019 Relating to Korean Application No. 10-2013-0155256.

*Primary Examiner* — Jin Cheng Wang
(74) *Attorney, Agent, or Firm* — Volentine, Whitt & Francos, PLLC

(57) ABSTRACT

An image processor comprises first scaling logic that receives image data comprising a first number of lines and generates first scaled image data by scaling down the image data in a first direction, a rotation buffer that has storage capacity for storing a second number of lines less than the first number of lines and stores the first scaled image data in a rotated state, and second scaling logic that generates second scaled image data by scaling down the first scaled image data in a second direction different from the first direction.

20 Claims, 6 Drawing Sheets

(51) Int. Cl.
*G06T 1/20* (2006.01)
*H04N 5/262* (2006.01)

(56) References Cited

U.S. PATENT DOCUMENTS

| | | | | |
|---|---|---|---|---|
| 6,580,435 | B1* | 6/2003 | Lippincott | G09G 5/397 |
| | | | | 345/543 |
| 6,801,674 | B1* | 10/2004 | Turney | G06T 3/0006 |
| | | | | 348/580 |
| 7,839,424 | B1 | 11/2010 | Clark et al. | |
| 8,111,331 | B2 | 2/2012 | Arnao et al. | |
| 8,792,749 | B2* | 7/2014 | Chang | G06T 3/4084 |
| | | | | 345/545 |
| 2002/0159656 | A1* | 10/2002 | Matsuki | G06T 1/60 |
| | | | | 382/305 |
| 2005/0174457 | A1* | 8/2005 | Yoshino | H04N 5/23293 |
| | | | | 348/333.01 |
| 2005/0286762 | A1* | 12/2005 | Park | G06T 3/60 |
| | | | | 382/166 |
| 2006/0181550 | A1* | 8/2006 | Nohara | G06T 3/0006 |
| | | | | 345/648 |
| 2006/0284876 | A1* | 12/2006 | Low | G06F 1/3203 |
| | | | | 345/536 |
| 2008/0226180 | A1* | 9/2008 | Hsieh | G06T 1/60 |
| | | | | 382/232 |
| 2009/0015717 | A1* | 1/2009 | Arnao | H04N 7/0122 |
| | | | | 348/581 |
| 2010/0156917 | A1* | 6/2010 | Lee | H04N 19/423 |
| | | | | 345/543 |
| 2011/0102465 | A1 | 5/2011 | Cho et al. | |
| 2011/0148888 | A1* | 6/2011 | Jacobs | G06F 3/1431 |
| | | | | 345/502 |
| 2011/0298982 | A1* | 12/2011 | Kobayashi | G06T 3/40 |
| | | | | 348/581 |
| 2013/0222413 | A1* | 8/2013 | Tripathi | G09G 5/02 |
| | | | | 345/600 |
| 2013/0223764 | A1* | 8/2013 | Tripathi | G06T 3/4007 |
| | | | | 382/298 |
| 2014/0063069 | A1* | 3/2014 | Prabakaran | G09G 5/00 |
| | | | | 345/660 |

FOREIGN PATENT DOCUMENTS

| | | |
|---|---|---|
| JP | 2010218263 | 9/2010 |
| KR | 20080072217 A | 8/2008 |
| KR | 20080095672 A | 10/2008 |

* cited by examiner

IMAGE PROCESSOR, FOR SCALING IMAGE DATA IN TWO DIRECTIONS, COMPUTING SYSTEM COMPRISING SAME, AND RELATED METHOD OF OPERATION

CROSS-REFERENCE TO RELATED APPLICATION

This application claims priority under 35 U.S.C. § 119 to Korean Patent Application No. 10-2013-0155256 filed on Dec. 13, 2013, the subject matter of which is hereby incorporated by reference in its entirety.

BACKGROUND OF THE INVENTION

The inventive concept relates generally to image processors, computing systems comprising image processors, and related methods of operation.

An image processor processes image data to be displayed on a display device. The image processor typically performs transformations on the image data, such as rotation, scaling, and/or translation. To perform these transformations, the image processor may comprise dedicated components or modules, such as a rotator for rotating image data, scaling logic for scaling down the image data in a horizontal or vertical direction, and so on.

To reduce power consumption, an image processor typically performs transformations on image data in an "on-the-fly" manner. In the "on-the-fly" manner, source image data is read from a system memory, a transformation is performed on the source image data and a result of the transformation is output directly to a display controller.

Although the "on-the-fly" manner can reduce power consumption, it also suffers from various shortcomings. For example, it is difficult for some image processors to support "on-the-fly" transformations because increases in the storage capacity of system memories and the bandwidths of system buses generally cannot keep up with increases in the resolution of displays and short burst lengths, which are inherent in certain "on-the-fly" transformations using line memories. To continue to support "on-the-fly" transformations with short burst lengths, image processors may need to include a considerable number of line memories, and may have scaling ratio limitations.

Image processors may perform transformations on image data in a deferred manner rather than in the "on-the-fly" manner, while risking an increase in overall system power consumption. In the deferred manner, results of transformations performed on source image data are output to a system memory and then transmitted from the system memory to a display controller. The deferred manner can support applications that require high performance, but may increase the power consumption of a system.

SUMMARY OF THE INVENTION

In one embodiment of the inventive concept, an image processor comprises first scaling logic that receives image data comprising a first number of lines and generates first scaled image data by scaling down the image data in a first direction, a rotation buffer that has storage capacity for storing a second number of lines less than the first number of lines and stores the first scaled image data in a rotated state, and second scaling logic that generates second scaled image data by scaling down the first scaled image data in a second direction different from the first direction.

In another embodiment of the inventive concept, a computing system comprises a system memory that stores a source image, an image processor that performs a rotation/scaling-down operation on the source image, and a system bus that connects the system memory and the image processor.

In another embodiment of the inventive concept, a method comprises receiving image data comprising a first number of lines, generating first scaled image data by scaling down the image data in a first direction, storing the first scaled image data in a rotation buffer that has storage capacity for storing a second number of lines less than the first number of lines and that stores the first scaled image data in a rotated state, and generating second scaled image data by scaling down the first scaled image data in a second direction different from the first direction.

These and other embodiments of the inventive concept may allow an image processor to support both applications that require high performance and applications that require low power consumption.

BRIEF DESCRIPTION OF THE DRAWINGS

The drawings illustrate selected embodiments of the inventive concept. In the drawings, like reference numbers indicate like features.

DETAILED DESCRIPTION

Embodiments of the inventive concept are described below with reference to the accompanying drawings. These embodiments are provided as teaching examples and should not be construed to limit the scope of the inventive concept.

The terminology used herein is for the purpose of describing embodiments only and is not intended to be limiting of the inventive concept. As used herein, the singular forms "a", "an" and "the" are intended to include the plural forms as well, unless the context clearly indicates otherwise. Terms such as "comprises", "comprising," "includes", "including", etc., where used herein, specify the presence of stated features but do not preclude the presence or addition of one or more other features.

Where a feature is referred to as being, e.g., "on", "connected to" or "coupled to" another feature, it can be directly on, connected or coupled to the other feature or intervening features may be present. In contrast, where a feature is referred to as being "directly on", "directly connected to" or "directly coupled to" another feature, there are no intervening features present. As used herein, the term "and/or" includes any and all combinations of one or more of the associated listed items.

Although the terms first, second, etc. are used herein to describe various features, the described features should not be limited by these terms. Rather, these terms are used merely to distinguish one feature from another. Thus, a first feature could be termed a second feature, and vice versa, without departing from the present teachings.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and this specification and should not be interpreted in an idealized or overly formal sense unless expressly so defined herein.

Figure 1:
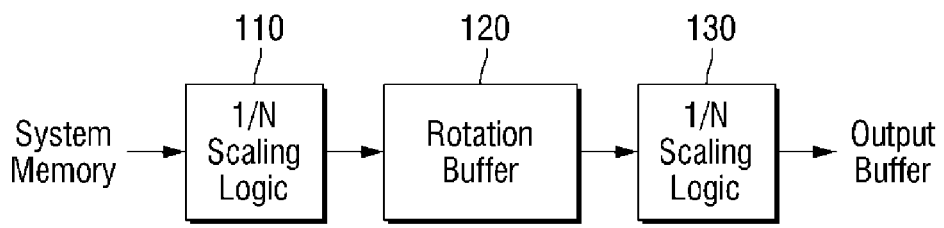
FIG. 1 is a block diagram illustrating a read Direct Memory Access (DMA) device according to an embodiment of the inventive concept.

FIG. 1 is a block diagram illustrating a read DMA device 100 according to an embodiment of the inventive concept.

Referring to FIG. 1, read DMA device 100 comprises first scaling logic 110, a rotation buffer 120, and second scaling logic 130.

Read DMA device 100 reads data of a source image from a system memory by accessing the system memory via a system bus. First scaling logic 110 receives image data of a first number of lines from the system memory. First scaling logic 110 scales down the image data of the first number of lines in a first direction, thereby generating first scaled image data. The first direction may be, for example, a horizontal direction.

The first scaled image data comprises a second number of lines, where the first number of lines is N times greater than the second number of lines (N>1). In other words, first scaling logic 110 performs first directional scaling-down on the image data of the first number of lines at a scaling ratio of 1/N.

Rotation buffer 120 receives the first scaled image data from first scaling logic 110. Rotation buffer 120 has storage capacity for storing fewer lines than the first number of lines, and it temporarily stores the first scaled image data. In some embodiments, rotation buffer 120 comprises a line memory capable of storing up to as many lines as the second number of lines.

Rotation buffer 120 stores the first scaled image data in a rotated state. Rotation buffer 120 may use various known methods such as a normal method in which image data is output by linearly scanning the system memory, a mirroring method in which image data is output by scanning the system memory so as to correspond to an image mirrored in a predetermined axis, for example, the X-axis, the Y-axis or the XY-axis, or a rotation method in which image data is output by scanning the system memory so as to correspond to an image rotated by a predetermined angle of, for example, 0°, 90°, 180° or 270°.

Second scaling logic 120 receives the first scaled image data from rotation buffer 120. Second scaling logic 120 scales down the first scaled image data in a second direction to generate second scaled image data. In some embodiments, the second direction is a vertical direction. Second scaling logic 120 performs second directional scaling-down on the first scaled image at a scaling ratio of 1/N. Second scaling logic 120 outputs the seconds scaled image data to outside read DMA device 100 (e.g., to an output buffer).

Figure 2:
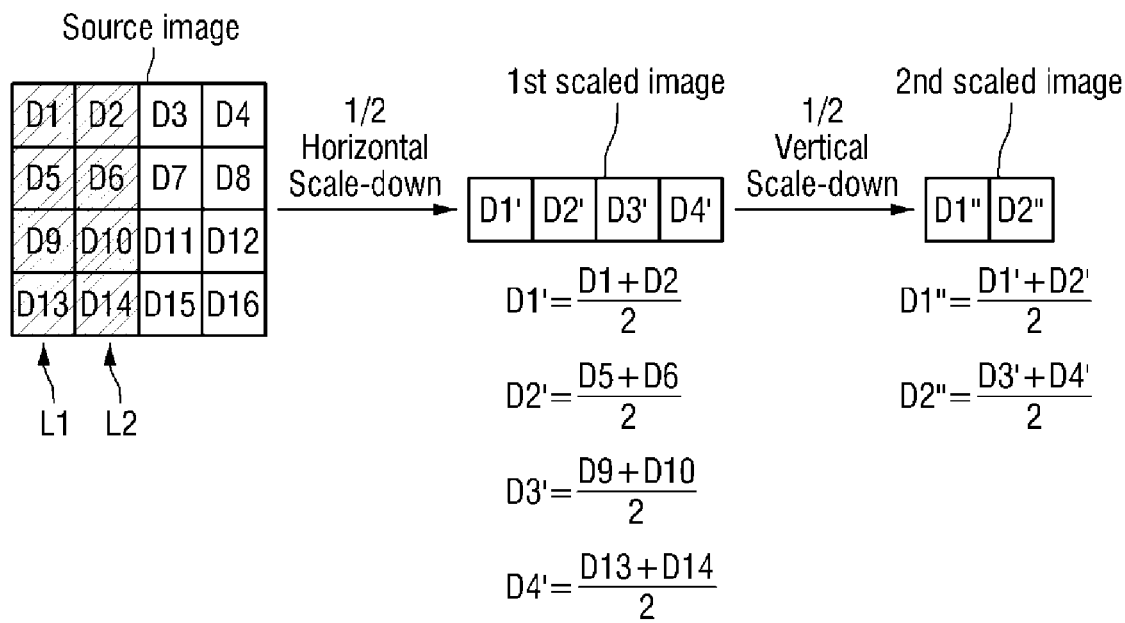
FIG. 2 is a diagram illustrating rotation/scaling-down operations performed by the read DMA device illustrated in FIG. 1.

FIG. 2 is a diagram illustrating rotation/scaling-down operations performed by read DMA device 100. More specifically, FIG. 2 illustrates a source image stored in the system memory, a first scaled image generated by first scaling logic 110 of read DMA device 100, and a second scaled image generated by second scaling logic 130 of read DMA device 100.

Data of the source image may be arranged in a matrix, and it may be divided into a plurality of lines comprising image data arranged in each column. In the description that follows, it is assumed that each of the plurality of lines includes four units of image data.

Read DMA device 100 issues a request for image data of a first line L1 and image data of a second line L2 to the system memory. Read DMA device 100 reads the image data of first line L1 and the image data of second line L2 by scanning the data of the source image in a column direction. That is, read DMA device 100 may scan the data of the source image in consideration of the state of rotation of the source image.

First scaling logic 110 of read DMA device 100 performs horizontal scaling-down on the image data of first line L1 and the image data of second line L2 at a scaling ratio of 1/2, thereby obtaining a first scaled image that includes four units of data forming a single line. The first scaled image data may be rearranged in a row direction and stored in rotation buffer 120 of read DMA device 100.

Second scaling logic 120 of read DMA device 100 performs vertical scaling-down on the first scaled image data at a scaling ratio of 1/2, thereby obtaining a second scaled image including two units of image data forming a single line.

By performing the above described rotation/scaling-down operation on all the lines of the source image, read DMA device 100 may obtain a rotated, 1/2 horizontally and vertically scaled-down image of the source image.

Read DMA device 100 illustrated in FIG. 1 can perform a rotation/scaling-down operation on image data having a number of lines greater than the storage capacity of the line memory. That is, read DMA device 100 can increase burst length without a need to increase the storage capacity of the line memory, and can thus support an "on-the-fly" rotation/scaling-down operation. Also, because read DMA device 100 does not need to increase the storage capacity of the line memory to increase burst length, read DMA device 100 can support a cost-effective rotation/scaling-down operation.

Read DMA device 100 is illustrated as using a scaling ratio of 1/2, but the inventive concept is not limited to this ratio. For example, the scaling ratio of read DMA device 100 may vary depending on the burst length supported by the system memory. The term "burst length", as used herein, indicates the size of data that can be read from the system memory at a time.

Read DMA device 100 is illustrated in FIG. 2 as scaling down image data by averaging the image data, but the inventive concept is not limited to averaging. Alternatively, read DMA device 100 could use various well-known scaling methods other than that set forth herein.

Figure 3:
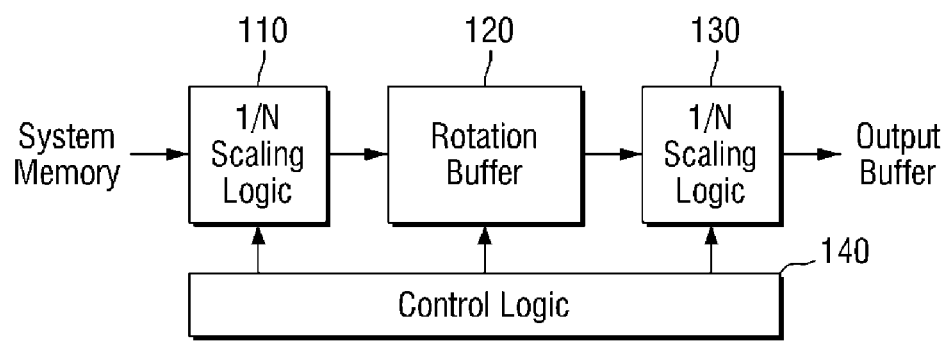
FIG. 3 is a block diagram illustrating a read DMA device according to another embodiment of the inventive concept.

FIG. 3 is a block diagram illustrating a read DMA device according to another embodiment of the inventive concept. The read DMA device of FIG. 3 has some similar features to the read DMA device of FIG. 1, so the following description will focus on features that are different from those of FIG. 1.

Referring to FIG. 3, a read DMA device 200 comprises first scaling logic 110, rotation buffer 120, second scaling logic 130, and control logic 140.

Read DMA device 200, similar to the device of FIG. 1, reads data of a source image from a system memory by accessing the system memory via a system bus. First scaling logic 110, receives image data of a first number of lines from the system memory, and it generates first scaled image data by scaling down the image data of the first number of lines in a first direction. Rotation buffer 120 has storage capacity for storing fewer lines than the first number of lines, and it temporarily stores the first scaled image data in a rotated state.

Second scaling logic 130 generates second scaled image data by scaling down the first scaled image data in a second direction, and it outputs the second scaled image data to outside read DMA device 200.

Control logic 140 controls general operations of read DMA device 200. Control logic 140 typically stores the scaling ratio of first scaling logic 110 or the scaling ratio of second scaling logic 130. Control logic 140 transmits a control command including the stored scaling ratio to first scaling logic 110 second scaling logic 140. In response to the receipt of the control command, first scaling logic 110 and second scaling logic 140 perform a scaling-down operation by using the scaling ratio in the control command. Control logic 140 may include a Special Function Register (SFR) for storing the scaling ratio of first scaling logic 110 or second scaling logic 130.

Figure 4:
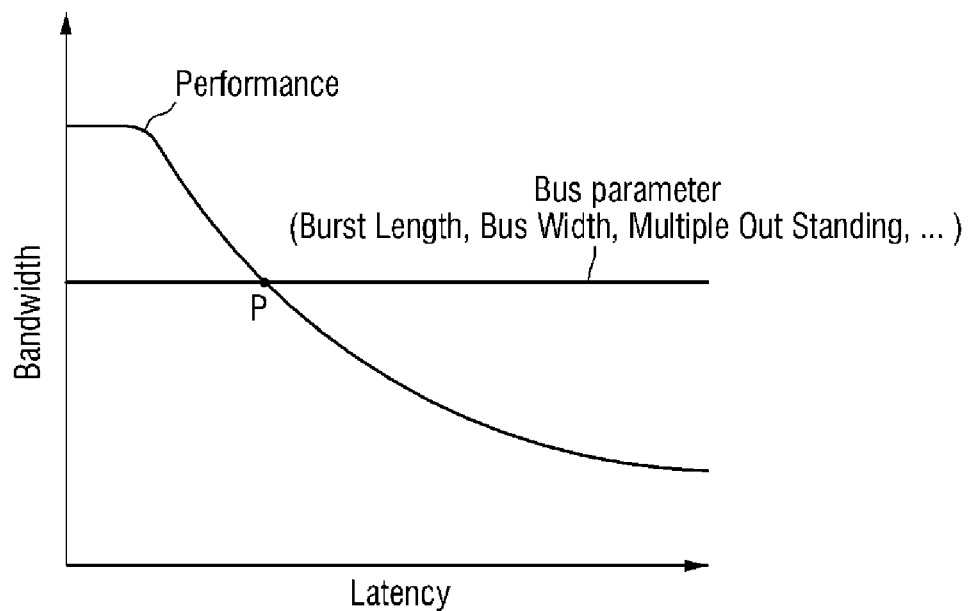
FIG. 4 is a graph illustrating the performance of the read DMA device illustrated in FIG. 1 or 3.

FIG. 4 is a graph illustrating the performance of read DMA device 100 or 200. In FIG. 4, the horizontal axis represents latency, and the vertical axis represents bandwidth.

Referring to FIG. 4, the performance of read DMA device 100 or 200 may be evaluated according to a point P of intersection between a performance curve and a bus parameter line.

Bus parameters that may affect the performance of read DMA device 100 or 200 may include, for instance, burst length, bus width, and others. Burst length, among other factors, depends highly on the storage capacity of a line memory due to the properties of an "on-the-fly" rotation/scaling-down operation. As indicated mentioned above, read DMA device 100 or 200 can increase burst length without the need to increase the storage capacity of a line memory, and can thus support applications that require high performance.

Figure 5:
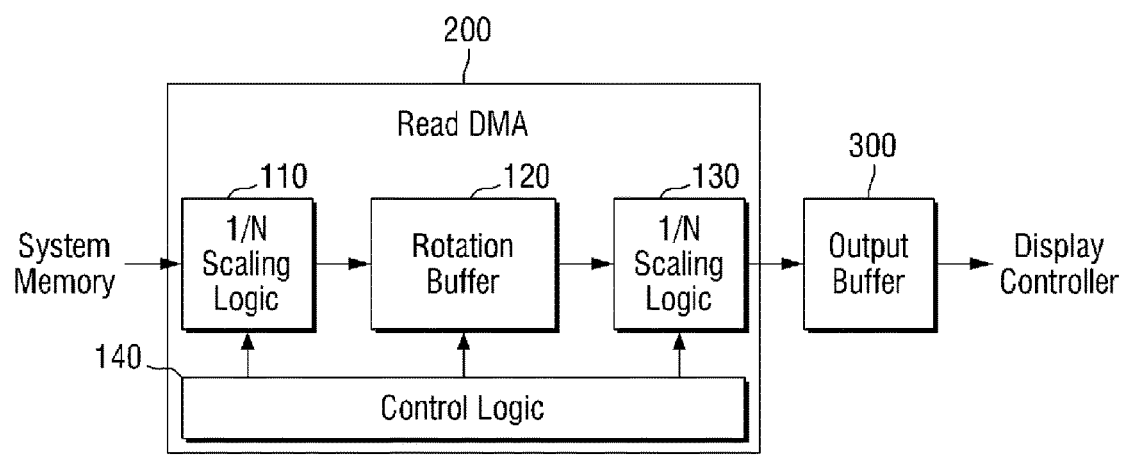
FIG. 5 is a block diagram of an image processor according to an embodiment of the inventive concept.

FIG. 5 is a block diagram illustrating an image processor according to an embodiment of the inventive concept.

Referring to FIG. 5, an image processor 1100 comprises a read DMA block 200 and an output buffer 300. Read DMA block 200 is connected to a system bus, and it reads data of a source image from a system memory by accessing the system memory via the system bus. Read DMA block 200 has the same structure as read DMA device 200 of FIG. 3.

Output buffer 300 is connected to read DMA block 200. Output buffer 300 receives second scaled image data from read DMA block 200. Output buffer 300 comprises various elements such as a flip-flop circuit, a latch circuit, a Static Random Access Memory (SRAM), etc., and it temporarily stores the second scaled image data. Output buffer 300 may output the second scaled image data to outside image processor 1100 (e.g., to a display controller).

The second scaled image data is transmitted directly to the display controller without passing through the system memory. That is, image processor 1100 is driven in an "on-the-fly" manner.

Figure 6:
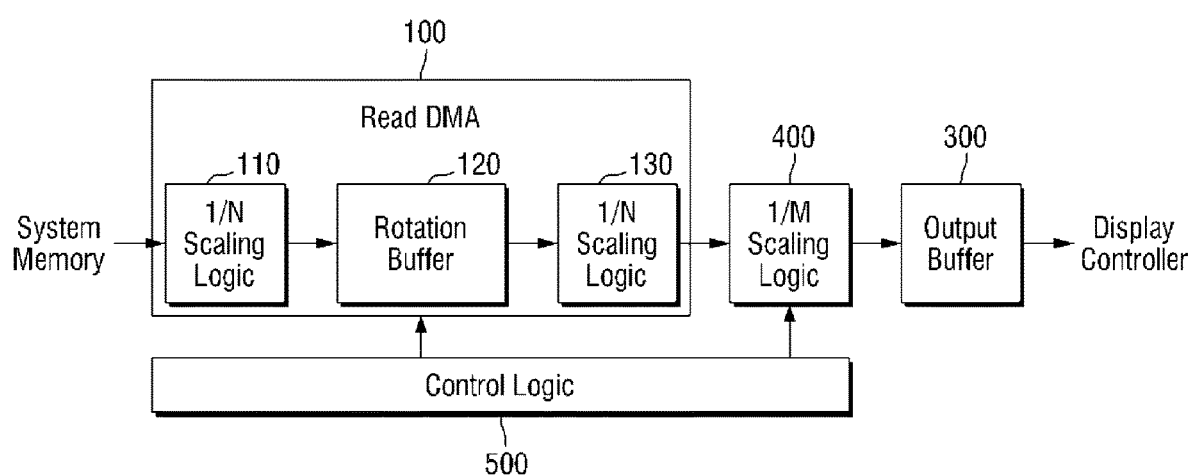
FIG. 6 is a block diagram of an image processor according to another embodiment of the inventive concept.

FIG. 6 is a block diagram illustrating an image processor according to another embodiment of the inventive concept. The image processor of FIG. 6 has many features similar to that of FIG. 5, so the following description will focus primarily on features that are different from those of FIG. 5.

Referring to FIG. 6, an image processor 1200 comprises a read DMA block 100, a third scaling logic 400, a control logic 500 and an output buffer 300.

Read DMA block 100 is connected to a system bus. Read DMA block 100 reads data of a source image from a system memory by accessing the system memory via the system bus. Read DMA block 100 has the same structure as read DMA device 100 of FIG. 1.

Third scaling logic 400 is connected to read DMA block 100. Third scaling logic 400 receives second scaled image data from read DMA block 100. Third scaling logic 400 performs additional scaling on the second scaled image data. More specifically, third scaling logic 400 may perform horizontal/vertical scaling. Third scaling logic 400 scales down the second scaled image data at a scaling ratio of 1/M (M>1). Accordingly, image processor 1200 performs scaling-down at a fractional scaling ratio.

Control logic 500 controls general operations of image processor 1200. Control logic 500 stores the scaling ratio of read DMA block 100 (e.g., the scaling ratio of first scaling logic 110 or the scaling ratio of second scaling logic 130) or the scaling ratio of third scaling logic 400. Control logic 500 transmits a control command including the stored scaling ratio to read DMA block 100 and third scaling logic 400. In response to the receipt of the control command, read DMA block 100 and third scaling logic 400 perform a scaling-down operation using the scaling ratio in the control command. Control logic 500 comprises an SFR for storing the scaling ratio of read DMA block 100 or third scaling logic 400.

Output buffer 300 is connected to third scaling logic 400. Output buffer 300 receives third scaled image data from third scaling logic 400. Output buffer 300 temporarily stores the third scaled image data, and it outputs the third scaled image data to outside image processor 1200.

Figure 7:
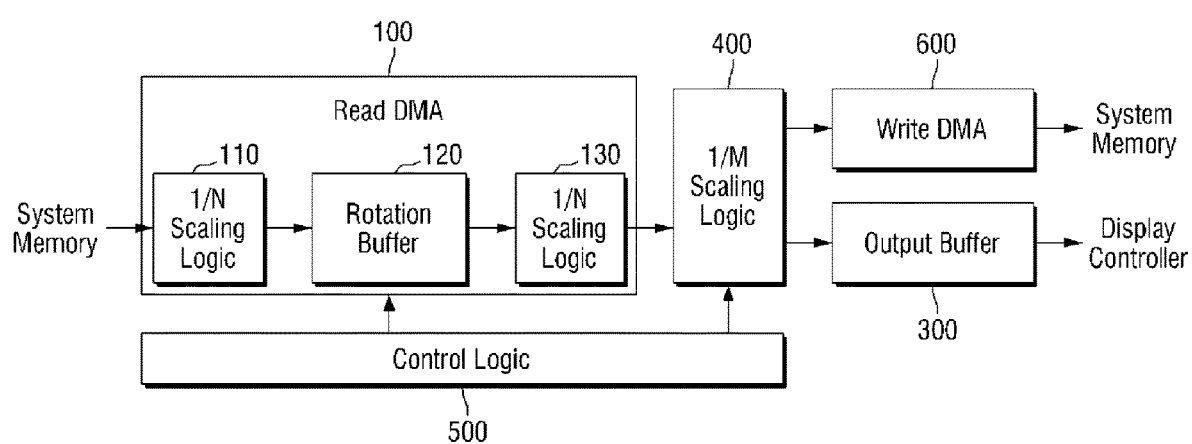
FIG. 7 is a block diagram of an image processor according to another embodiment of the inventive concept.

FIG. 7 is a block diagram illustrating an image processor according to another embodiment of the inventive concept. The image processor of FIG. 7 has many features similar to that of FIG. 6, so the following description will focus primarily on features that are different from those of FIG. 6.

Referring to FIG. 7, an image processor 1300 comprises a read DMA block 100, a third scaling logic 400, a control logic 500, an output buffer 300 and a write DMA block 600.

Read DMA block 100 is connected to a system bus, and it reads data of a source image from a system memory by accessing the system memory via the system bus. Read DMA block 100 has the same structure as read DMA device 100 of FIG. 1.

Third scaling logic 400 receives second scaled image data from read DMA block 100, and it performs additional scaling on the second scaled image data at a scaling ratio of 1/M (M>1). Control logic 500 controls operations of image processor 1300, stores the scaling ratio of read DMA block 100 or the scaling ratio of third scaling logic 400, and transmits a control command including the stored scaling ratio to read DMA block 100 and third scaling logic 400.

Output buffer 300 receives third scaled image data from third scaling logic 400, temporarily stores the third scaled image data, and outputs the third scaled image data to outside image processor 1300.

Write DMA block 600 is connected to third scaling logic 400. Write DMA block 600 receives the third scaled image data from third scaling logic 400. Write DMA block 600 outputs the third scaled image data to outside image processor 1300 (e.g., to the system memory).

In some embodiments, image processor 1100 of FIG. 5 is modified to further include write DMA block 600. In some embodiments, write DMA block 600 is also connected to read DMA block 200, receives the second scaled image data, and outputs the second scaled image data to outside image processor 1300.

Image processors 1100 and 1300 of FIGS. 5 and 7 may selective use an "on-the-fly" manner or a deferred manner.

Figure 8:
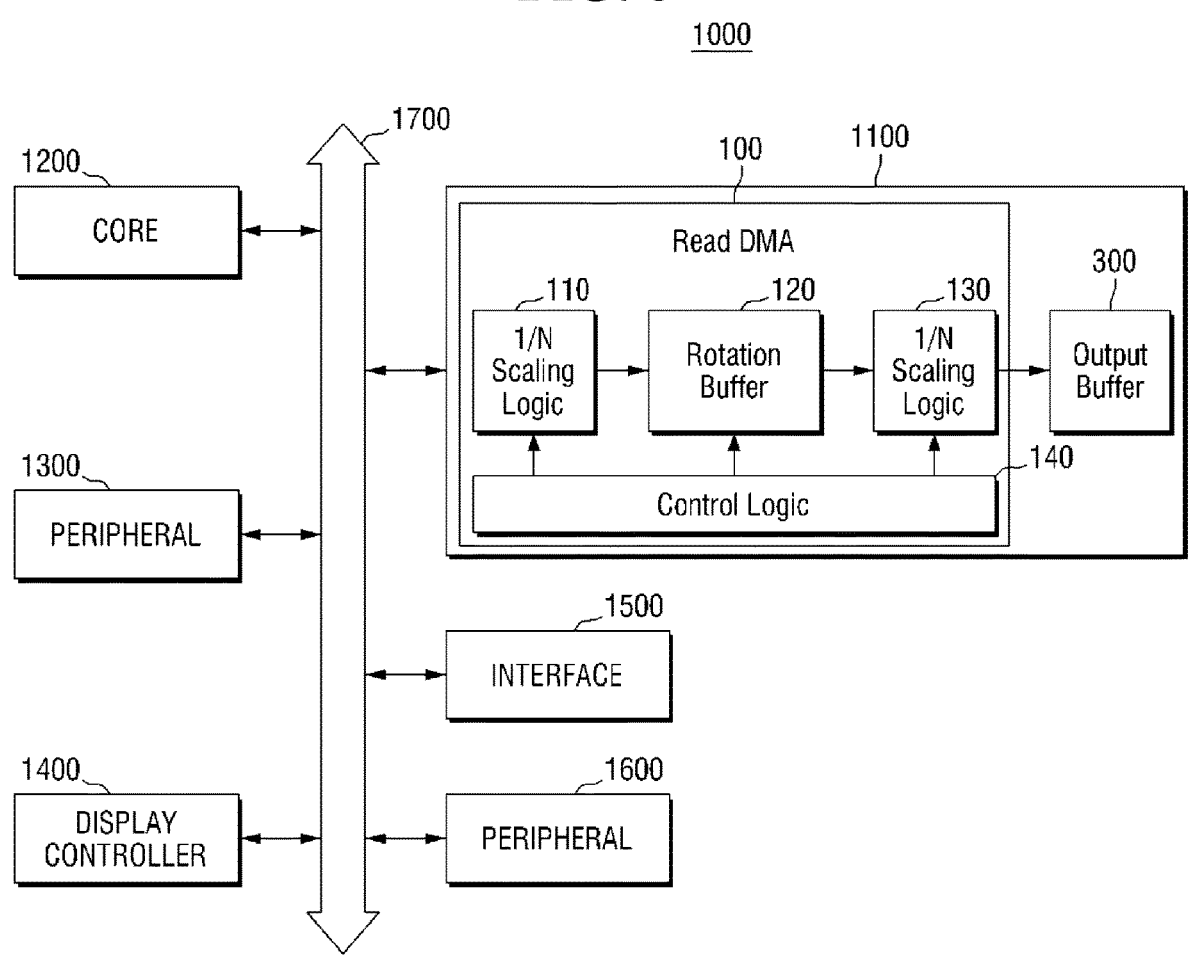
FIG. 8 is a block diagram illustrating a computing system comprising an image processor, according to an embodiment of the inventive concept.

FIG. 8 is a block diagram illustrating a computing system comprising an image processor, according to an embodiment of the inventive concept.

Referring to FIG. 8, a computing system 1000 comprises a core processor 1200, a system memory 1300, a display controller 1400, an image processor 1100, an interface device 1500 and a peripheral device 1600.

Core processor 1200, system memory 1300, display controller 1400, image processor 1100, interface device 1500, and peripheral device 1600 are connected to one another via a system bus 1700. System bus 1700 is a path via which data is transmitted.

Core processor 1200 may include a single core or a plurality of cores, and may process data by using the core(s). In some embodiments, core processor 1200 comprises a multi-core processor such as a dual-core processor, a quad-core processor, or a hexa-core processor. Core processor 1200 may also include a cache memory (not illustrated) disposed in or outside core processor 1200.

System memory 1300 stores commands and/or data. System memory 1300 serves as a main memory of computing system 1000. In some embodiments, system memory 1300 comprises a Low Power Double Data Rate (LPDDR) Dynamic Random Access Memory (DRAM). System memory 1300 may store a source image on which a rotation/scaling-down operation is to be performed.

Display controller 1400 controls a display device (not illustrated) to display images.

Image processor 1100 performs a rotation/scaling-down operation on the source image. Computing system 1000 is illustrated in FIG. 8 as including the same image processor as that illustrated in FIG. 5. Alternatively, computing system 1000 may include image processor 1200 or 1300 of FIG. 6 or 7. Image processor 1100, 1200, or 1300 performs a rotation/scaling-down operation on the source image, and it outputs a result of the rotation/scaling-down operation to system memory 1300 or directly to display controller 1400.

Interface device 1500 transmits data to or receives data from a communication network (not illustrated). In some embodiments, interface device 1500 comprises an antenna (not illustrated) or a wired or wireless transceiver (not illustrated).

Peripheral device 1600 may comprise, e.g., a serial communication device, a memory management device, an audio processing device, etc.

Although not specifically illustrated in FIG. 8, the computing system may also include a nonvolatile memory device such as a One Time Programmable Read Only Memory (OTPROM), an Electrically Erasable Programmable Read Only Memory (EEPROM), a flash memory, etc.

Computing system 1000 may be provided as an element of an arbitrary mobile system, such as a mobile phone, a smart phone, a Personal Digital Assistant (PDA), a tablet, etc., in the form of, for example, a System-On-Chip (SOC).

Figure 9:
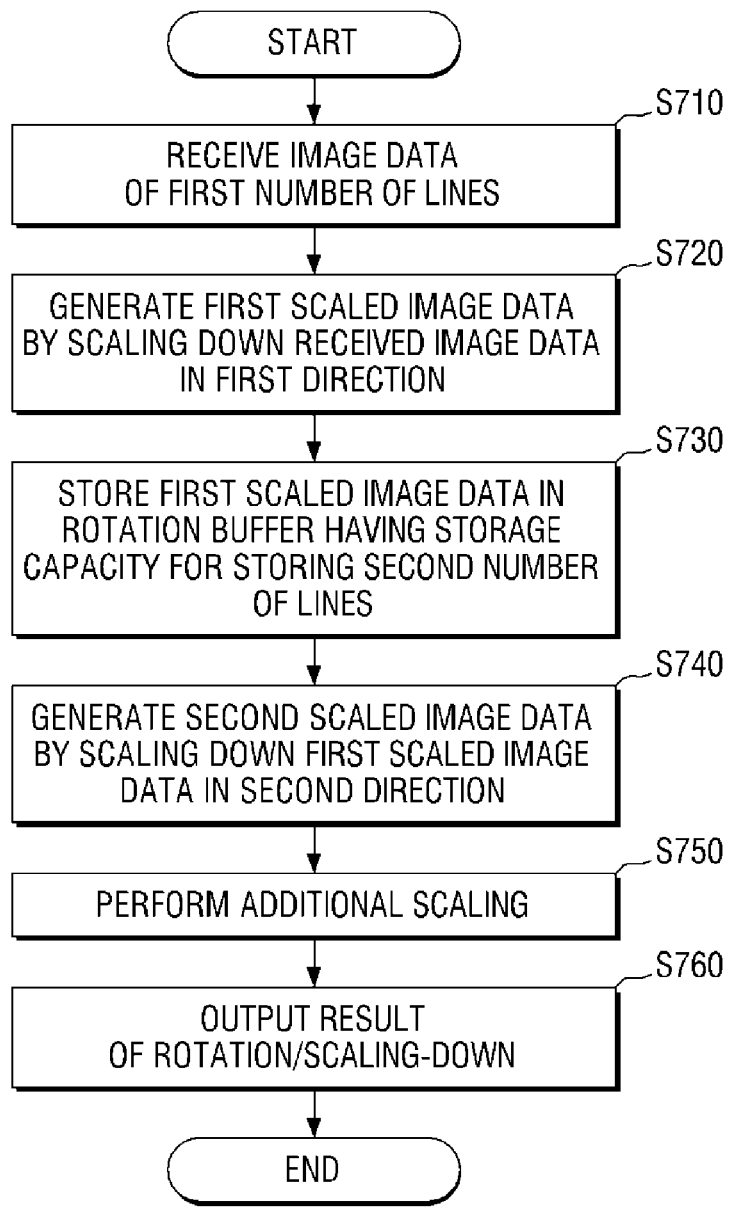
FIG. 9 is a flowchart illustrating an image processing method according to an embodiment of the inventive concept.

FIG. 9 is a flowchart illustrating an image processing method according to an embodiment of the inventive concept.

Referring to FIG. 9, data of a first number of lines of a source image is received from a system memory (S710). First scaled image data is generated by scaling down the data of the first number of lines of the source image data in a first direction at a scaling ratio of 1/N (N>1) (S720). As indicated above, the first direction may be a horizontal direction. The first scaled image data includes a second number of lines, and the first number of lines is N times greater than the second number of lines.

The first scaled image data is temporarily stored in a rotation buffer having storage capacity for storing up to as many lines as the second number of lines (S730). The first scaled image data may be stored in a rotated state. The rotation buffer may include a line memory having storage capacity for storing up to as many lines as the second number of lines.

Second scaled image data is generated by scaling down the first scaled image data in a second direction at a scaling ratio of 1/N (S740). As already mentioned above, the second direction may be a vertical direction.

The second scaled image data may be additionally scaled down at a scaling ratio of 1/M (M>1) (S750). The result of rotation/scaling-down performed on the source image is output to a system memory or a display controller (S760).

The foregoing is illustrative of embodiments and is not to be construed as limiting thereof. Although a few embodiments have been described, those skilled in the art will readily appreciate that many modifications are possible in the embodiments without materially departing from the scope of the inventive concept. Accordingly, all such modifications are intended to be included within the scope of the inventive concept as defined in the claims.

What is claimed is:

1. An image processor comprising:
   first scaling logic that:
      receives, from a system memory, image data comprising a first number of lines in a first direction, each of the first number of lines having a number of image data units in a second direction different from the first direction, and
      generates first scaled image data, having a second number of lines in the first direction that is less than the first number of lines, each of the second number of lines having the number of image data units in the second direction, wherein the first scaled image data is generated by scaling down the image data in the first direction by averaging the image data and by not scaling down the image data in the second direction;
   a rotation buffer that has storage capacity for storing the second number of lines and stores the first scaled image data in a rotated state; and
   second scaling logic that generates second scaled image data by scaling down the first scaled image data by averaging the first scaled image data, which is stored in the rotation buffer, in the second direction, wherein
   a ratio for scaling down the image data in the first direction varies depending on a burst length supported by the system memory, wherein the burst length indicates a size of data that can be read from the system memory at a time.

2. The image processor of claim 1, wherein the first number of lines is N times greater than the second number of lines (N>1) and the first scaling logic generates the first scaled image data by scaling down the image data of the first number of lines in the first direction with a scaling ratio of 1/N.

3. The image processor of claim 2, wherein the second scaling logic generates the second scaled image data by scaling down the first scaled image data in the second direction with the scaling ratio of 1/N.

4. The image processor of claim 1, wherein the first direction is a horizontal direction and the second direction is a vertical direction.

5. The image processor of claim 1, wherein the rotation buffer comprises a line memory having storage capacity for storing a maximum of the second number of lines.

6. The image processor of claim 1, further comprising third scaling logic that receives the second scaled image data from the second scaling logic and performs additional scaling on the second scaled image data.

7. The image processor of claim 1, further comprising a register that stores the ratio for scaling down the image data in the first direction or a ratio for scaling down the image data in the second direction.

8. The image processor of claim 1, further comprising a write Direct Memory Access (DMA) block that receives the second scaled image data from the second scaling logic and outputs the second scaled image data to the system memory.

9. The image processor of claim 1, further comprising an output buffer that receives the second scaled image data from the second scaling logic and outputs the second scaled image data to a display controller.

10. The image processor of claim 9, wherein the second scaled image data is transmitted directly to the display controller without passing through the system memory.

11. The image processor of claim 1, wherein the rotation buffer is different from the system memory.

12. A computing system comprising:
a system memory that stores a source image;
an image processor that performs a rotation/scaling-down operation on the source image; and
a system bus that connects the system memory and the image processor,
wherein the image processor comprises:
first scaling logic that:
receives image data of a first number of lines in a first direction, each of the first number of lines having a number of image data units in a second direction different from the first direction, and
generates first scaled image data, having a second number of lines in the first direction that is less than the first number of lines, each of the second number of lines having the number of image data units in the second direction, wherein the first scaled image data is generated by scaling down the image data by averaging the image data in the first direction and by not scaling down the image data in the second direction;
a rotation buffer that has storage capacity for storing the second number of lines and that stores the first scaled image data in a rotated state; and
second scaling logic that generates second scaled image data by scaling down the first scaled image data by averaging the first scaled image data, which is stored in the rotation buffer, in the second direction, wherein
a ratio for scaling down the image data in the first direction varies depending on a burst length supported by the system memory, wherein the burst length indicates a size of data that can be read from the system memory at a time.

13. The computing system of claim 12, wherein the first number of lines is N times greater than the second number of lines (N>1), and the first scaling logic generates the first scaled image data by scaling down the image data of the first number of lines in the first direction with a scaling ratio of 1/N.

14. The computing system of claim 13, wherein the second scaling logic generates the second scaled image data by scaling down the first scaled image data in the second direction with the scaling ratio of 1/N.

15. The computing system of claim 12, further comprising:
a display controller that controls a display device,
wherein the second scaled image data is transmitted directly to the display controller without passing through the system memory.

16. The computing system of claim 12, wherein the rotation buffer is different from the system memory.

17. A method comprising:
receiving, from a system memory, image data comprising a first number of lines in a first direction, each of the first number of lines having a number of image data units in a second direction different from the first direction;
generating first scaled image data, having a second number of lines that is less than the first number of lines, each of the second number of lines having the number of image data units in the second direction, wherein the first scaled image data is generated by scaling down the image data in the first direction and by not scaling down the image data in the second direction;
storing the first scaled image data in a rotation buffer that has storage capacity for storing the second number of lines and that stores the first scaled image data in a rotated state;
generating second scaled image data by scaling down the first scaled image data, which is stored in the rotation buffer, in the second direction; and
generating third scaled image data, having a third number of lines that is less than the second number of lines, by scaling down the second scaled image data, wherein
a ratio for scaling down the image data in the first direction varies depending on a burst length supported by the system memory, wherein the burst length indicates a size of data that can be read from the system memory at a time.

18. The method of claim 17, wherein the first number of lines is N times greater than the second number of lines (N>1), and the first scaled image data is generated by scaling down the image data of the first number of lines in the first direction with a scaling ratio of 1/N.

19. The method of claim 18, wherein the second scaled image data is generated by scaling down the first scaled image data in the second direction with the scaling ratio of 1/N.

20. The method of claim 19, wherein the first direction is a horizontal direction and the second direction is a vertical direction.

* * * * *